(12) United States Patent
Xie et al.

(10) Patent No.: US 8,685,528 B2
(45) Date of Patent: *Apr. 1, 2014

(54) SHAPE MEMORY POLYMER AND ADHESIVE COMBINATION AND METHODS OF MAKING AND USING THE SAME

(75) Inventors: Tao Xie, Troy, MI (US); Joseph A. Hulway, Romeo, MI (US); Xingcheng Xiao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

This patent is subject to a terminal disclaimer.

(21) Appl. No.: 12/423,947

(22) Filed: Apr. 15, 2009

(65) Prior Publication Data

US 2009/0280330 A1 Nov. 12, 2009

Related U.S. Application Data

(63) Continuation-in-part of application No. 11/867,572, filed on Oct. 4, 2007.

(60) Provisional application No. 60/925,418, filed on Apr. 20, 2007, provisional application No. 61/086,216, filed on Aug. 5, 2008.

(51) Int. Cl.
    *B32B 3/00* (2006.01)

(52) U.S. Cl.
    USPC ........... 428/174; 428/354; 428/188; 428/617; 428/413; 428/423.1; 428/421; 428/457; 428/426; 156/711

(58) Field of Classification Search
    USPC .......... 156/311, 247, 499, 230, 285, 286, 156/701–719; 428/413, 423.1, 421, 457, 428/426, 617, 174, 354, 188; 525/524, 407; 414/524, 407

See application file for complete search history.

(56) References Cited

U.S. PATENT DOCUMENTS

| | | | | |
|---|---|---|---|---|
| 5,002,818 A | * | 3/1991 | Licari et al. | 428/209 |
| 5,672,402 A | * | 9/1997 | Kreckel et al. | 428/34.2 |
| 5,755,913 A | | 5/1998 | Liaw et al. | |
| 5,928,803 A | * | 7/1999 | Yasuda | 374/101 |
| 6,156,842 A | * | 12/2000 | Hoenig et al. | 525/171 |
| 6,589,892 B1 | * | 7/2003 | Smith et al. | 442/414 |
| 6,692,807 B2 | * | 2/2004 | Bries et al. | 428/40.1 |
| 6,759,481 B2 | | 7/2004 | Tong | |

(Continued)

FOREIGN PATENT DOCUMENTS

DE 102008050024 A1 4/2009
WO 2007070877 A2 6/2007

OTHER PUBLICATIONS

Aubert JH, Thermally Removable Epoxy Adhesives Incorporating Thermally Reversible Diels-Alder Adducts, 2003, Journal of Adhesion, vol. 79, pp. 609-616.*

(Continued)

*Primary Examiner* — Christopher Schatz
(74) *Attorney, Agent, or Firm* — BrooksGroup (57) ABSTRACT

One exemplary embodiment includes a thermo-reversible polymer adhesive including a dry adhesive layer and shape memory polymer layer, the shape memory polymer material capable of transitioning from a first shape to a second shape upon heating and imposition of a load to conform to the surface topography of a substrate to which the adhesive is applied.

20 Claims, 4 Drawing Sheets

SHAPE RECOVERY
UPON HEATING (56) References Cited

U.S. PATENT DOCUMENTS

| | | | |
|---|---|---|---|
| 6,773,535 | B1 | 8/2004 | Wetzel |
| 6,827,325 | B2 | 12/2004 | Hofmann et al. |
| 6,986,855 | B1 | 1/2006 | Hood et al. |
| 7,188,498 | B2 | 3/2007 | Browne et al. |
| 2001/0047579 | A1 | 12/2001 | Lee et al. |
| 2003/0060573 | A1* | 3/2003 | Walter et al. .................. 525/452 |
| 2003/0150557 | A1* | 8/2003 | Sezi et al. .................. 156/330.9 |
| 2005/0151385 | A1 | 7/2005 | Autumn et al. |
| 2005/0167556 | A1 | 8/2005 | Fontana et al. |
| 2005/0240190 | A1 | 10/2005 | Gall et al. |
| 2005/0271869 | A1* | 12/2005 | Jackson ..................... 428/297.4 |
| 2005/0274455 | A1 | 12/2005 | Extrand |
| 2006/0036045 | A1 | 2/2006 | Wilson et al. |
| 2006/0156535 | A1 | 7/2006 | Browne et al. |
| 2006/0188706 | A1* | 8/2006 | Kobayashi et al. ......... 428/317.1 |
| 2007/0023137 | A1* | 2/2007 | Merz .......................... 156/275.7 |
| 2007/0073130 | A1 | 3/2007 | Finch et al. |
| 2007/0289786 | A1 | 12/2007 | Cutkosky et al. |
| 2008/0027199 | A1* | 1/2008 | Mazurek et al. ................ 528/10 |
| 2008/0269420 | A1* | 10/2008 | Tong et al. .................... 525/208 |

OTHER PUBLICATIONS

Nelson et al., Shape Recovery of Nanoscale Imprints in a Thermoset "Shape Memory" Polymer, Applied Physics Letters, 2005, 86, 103108.
Lendlein et al., Shape-Memory Polymers, Angewandte Chem. Int. Ed., 2002, pp. 2034-2057, vol. 41.
Xie et al., Self-Peeling Reversible Dry Adhesive System, Chem. Mater., 2008, pp. 2866-2868, vol. 20.
Liu et al., Chemically Cross-Linked Polycyclooctene: Synthesis, Characterization and Shape Memory Behavior, Macromolecules, 2002. pp. 9868-9874, vol. 35.
Lendlein et al., Biodegradable, Elastic Shape-Memory Polymers for Potential Biomedical Applications, Science, May 31, 2002, pp. 1673-1676, vol. 296.
Lee et al., Structure and Thermomechanical Properties of Polyurethane Block Copolymers with Shape Memory Effect, Macromolecules, 2001, pp. 6431-6437, vol. 34.
Lin et al., Study on Shape-Memory Behavior of Polyether-Based Polyurethanes. I. Influence of the Hard-Segment Content, J. of Applied Polymer Science, 1998, pp. 1563-1574, V.69.
Lin et al., Study on Shape-Memory Behavior of Polyether-Based Polyurethanes. II. Influence of Soft-Segment Molecular Weight, J. of App. Polymer Science, 1998, pp. 1575-1586, 69.
EPON Resin 828 Structural Reference Manual, Shell Chemicals, Houston, TX.
Gall et al., Shape Memory Polymer Nanocomposites, Acta Materialia, 2002, pp. 5115-5126, vol. 50.
Gall et al., Internal Stress Storage in Shape Memory Polymer Nanocomposites, Applied Physics Letter, Jul. 12, 2004, pp. 290-292, vol. 85, No. 2.
Xu et al., Synthesis and Shape Memory Effects of Si—O—Si Cross-Linked Hybrid Polyurethanes, Polymer, 2006, pp. 457-465, vol. 47.
Crystallisation of Liquid DGEBPA and DGEBPF Epoxy Resins, Resolution Performance Products, Product Bulletin, SC:2365-01, Jul. 2001.
Jeffamine D-230 Polyetheramine, Technical Bulletin, Huntsman Corporation, Copyright 2006.
Xie et al., Self-Peeling Reversible Dry Adhesive System, Materials, & Processes Laboratory, General Motors Research & Development Center, Chem. Mater. 2008,vol. 20, pp. 2866-2.
Aubert et al., Thermally Removable Epoxy Adhesives Incorporating Thermally Reversible Diels-Alder Adducts, The Journal of Adhesion, 2003, vol. 79, pp. 609-616.
International Search Report and Written Opinion, International Application No. PCT/US/2008/060796 Filed Apr. 18, 2008, Appicant GM Global Technology Operations, Inc.
Unver et al., Geckbot: A Gecko Inspired Climbing Robot Using Elastomer Adhesives.
Daltorio et al., A Small Wall-Walking Robot with Compliant, Adhesive, Feet, IEEE/RSJ International Conference on Intelligent Robots and Systems, 2005, pp. 4018-4023.
International Search Report and Written Opinon, International Application No. PCT/US2008/060826 filed Apr. 18, 2008, Applicant GM Global Technology Operations, Inc.
Lee et al., A Reversible Wet/Dry Adhesive Inspired by Mussels and Geckos, Nature, Jul. 19, 2007, pp. 338-342, vol. 448.
Lee et al., Single-Molecule Mechanics of Mussel Adhesion, PNAS, Aug. 29, 2005, pp. 12999-13-3, vol. 103, No. 35.
Veriflex Shape Memory Polymer, http://www.crgrp.net/veriflex.shtml, Cornerstone Research Group, Inc., 2003-2007.
Shape Memory Polymer, http://crgnp.net/success-stories.shtml, Cornerstone Research Group, Inc., 2003-2007.
TEMBO Shape Memory Polymers and Elastic Memory Composite (EMC) Material, http://www.ctd-materials.com/products/emc.htm, Cornerstone Research Group, Inc., 2003-2007.
Behl et al., Shape-Memory Polymers: Dual Shape Materials for Bio-medical Applications, A. Mater. Today, 2007, vol. 10, pp. 1-20.
Bellin et al., Polymeric Triple-Shape Materials, PNAS, Nov. 28, 2006, vol. 103, No. 48, pp. 18043-18047.
Chung et al., Two-Way Reversible Shape Memory in a Semicrystalline Network, Macromolecules, 2008, vol. 41, pp. 184-192.
Rousseau et al., Shape Memory Effect Exhibited by Smectic-C Liquid Crystalline Elastomers, J. Am. Chem. Soc., 2003, vol. 125, pp. 15300-15301.
Liu et al., Review of Progress in Shape-Memory Polymers, Journal of Materials Chemistry, 2007, vol. 17, pp. 1543-1558.
Dietsch et al., A Review—Features and Benefits of Shape Memory Polymers (SMPs), Journal of Advanced Materials, Apr. 2007, vol. 39, No. 2, pp. 3-12.
Li et al., Shape Memory Effect of Ethylene-Vinyl Acetate Copolymers, Journal of Applied Polymer Science, 1999, vol. 71, pp. 1063-1070.
Liu et al., Novel Shape-Memory Polymer with Two Transition Temperatures, Macromol. Rapid Commun., 2005, vol. 26, pp. 649-652.
Reyntjens et al., Polymer Networks Contaiinign Crystallizable Poly(octadecyl vinyl ether) Segments for Shape-Memory Materials, Macromol. Rapid Commun., 1999, vol. 20,pp. 251-255.
Jiang et al., Polymers Move in Response to Light, Advanced Materials., 2006, vol. 18, pp. 1471-1475.
Huang et al., Water-Driven Programmable Polyurethane Shape Memory Polymer: Demonstration and Mechanism, Applied Physical Letters, 2005, vol. 86, pp. 114105-1-3.
Lendlein et al., Light-Induced Shape-Memory Polymers, Nature, Apr. 14, 2005, vol. 434, pp. 879-882.
Goethals et al., Poly(vinyl ethers) as Building Blocks for New Materials, Macromol. Symp. 1998, vol. 132, pp. 57-64.
Xie, U.S. Appl. No. 12/105,865, Attachment Pad with Thermal Reversible Adhesive and Methods of Making and Using the Same, filed Apr. 18, 2008.
Xie, U.S. Appl. No. 11/867,558, Multilayer Adhesive for Thermal Reversible Joining of Substrates, filed Oct. 4, 2007.
Xie, U.S. Appl. No. 12/391,704, Reversible Dry Adhesives for Wet adn Dry Conditions, filed Feb. 24, 2009.
Xie, U.S. Appl. No. 12/105,749, Method for Robotic Handling Using Thermo-Reversible Dry Adhesives, filed Apr. 18, 2008.
Xie, U.S. Appl. No. 12/105,788, Climbing Devices Based on Thermo-Reversible Dry Adhesives, filed Apr. 18, 2008.
Xie, U.S. Appl. No. 10/04/2007, Shape Memory Epoxy Polymers, filed Oct. 4, 2007.
Xiao, U.S. Appl. No. 12/273,083, Self-Healing and Scratch Resistant Shape Memory Polymer System, filed Nov. 18, 2008.
Xie, U.S. Appl. No. 11/867,531, Reversible Dry Adhesives, filed Oct. 4, 2007.
Xie, U.S. Appl. No. 12/396,045, Polymer Systems with Multiple Shape Memory Effect, filed Mar. 2, 2009.
Xie, U.S. Appl. No. 12/367,826, A Reversible Welding Process for Polymers, filed Feb. 9, 2009.
Xie, U.S. Appl. No. 12/178,844, High Strength Reversible Noncovalent Adhesion Methods for a Solid Polymer-Polymer Interface, filed Jul. 24, 2008.

(56) References Cited

OTHER PUBLICATIONS

Cheng, U.S. Appl. No. 12/359,709, Remote Activation of Thermo-Reversible Dry Adhesives, filed Jan. 26, 2009.

Xie, U.S. Appl. No. 12/423,947, Shape Memory Polymer and Adhesive Combination and Methods of Making and Using the Same, filed Apr. 15, 2009.

Xie, U.S. Appl. No. 12/432,211, Shape Memor Polymers with Surface Having Dangling Adhesive Polymeric Chains and Methods of Making and Using the Same, filed Apr. 29, 2009.

Xie, U.S. Appl. No. 12/181,562, Polymer Systems with Multiple Shape Memory Effect, filed Jul. 29, 2008.

Xie, U.S. Appl. No. 11/867,549, Method of Miniimizing Residue Adhesion for Thermo-Reversible Dry Adhesives, filed Oct. 4, 2007.

German Office Action dated May 15, 2012; Application SN:102009035621.5; Applicant: GM Global Technology Operations LLC; 5 pages.

Chinese Office Action dated Mar. 15, 2013; Application No. 200910173307.0; Applicant: GM Global Technology Operations, Inc.; 6 pages.

\* cited by examiner

SHAPE MEMORY POLYMER AND ADHESIVE COMBINATION AND METHODS OF MAKING AND USING THE SAME

This application is a continuation-in-part of U.S. patent application Ser. No. 11/867,572, filed Oct. 4, 2007 which claims the benefit of U.S. Provisional Application No. 60/925,418, filed Apr. 20, 2007. This application also claims the benefit of U.S. Provisional Application No. 61/086,216, filed on Aug. 5, 2008.

TECHNICAL FIELD

The field to which the disclosure generally relates to includes shape memory polymers and shape memory polymer and adhesive combinations.

BACKGROUND

Shape memory polymers are polymer materials which may be returned from a deformed state to their original shape or "permanent configuration" via an external stimulus. The external stimulus typically is temperature in the case of thermally activated shape memory polymers but can also be the application of an electric or magnetic field, light or a change in pH.

Gecko feet pads, with nanohair structures on them, are examples of smart dry adhesives. The working principle of the Gecko adhesion is that the nanohair structure allows the foot pad to make maximum contact with a counter surface regardless of its roughness and chemical composition. This is accomplished by nanohairs that are relatively long and protruding from the foot pad at an angle so that adjacent nanohairs can contact the counter surface regardless of its topography. The maximum contact further allows for accumulation of millions of small van der Waals (in the range of microNewtons) interactions between the Gecko foot pad and the counter surface, leading to an overall adhesion force (pull-off force) of about 10 $N/cm^2$. When the detaching force is employed in a peel-off mode, however, the complete detachment is achieved gradually by overcoming small adhesion forces corresponding to very small areas. Thus, the adhesion is easily reversed. Overall, the attractiveness of the Gecko adhesion lies in the combination of adhesive strength (10 $N/cm^2$), reversibility, and the ability to adapt to a variety of surfaces in terms of both the surface roughness and composition. The above unique features of the Gecko adhesion has stimulated scientific research efforts to produce synthetic smart dry adhesives that work using the same principle as the Gecko feet. Up to now, the two best synthetic Gecko adhesives show maximum pull-off force of 3 and 10 $N/cm^2$ towards glass. Both adhesives suffer from severe adhesion loss after only one or two attaching/detaching cycles, as a result of breakdown or the lateral collapse of the nano structures, with the latter referring adjacent nano-hairs bonding to each other In addition, synthetic Gecko adhesives are expensive to produce and large-scale manufacturing is practically too difficult.

SUMMARY OF EXEMPLARY EMBODIMENTS OF THE INVENTION

One embodiment of the invention includes a composition of a multilayer thermo-reversible dry adhesive comprising at least one layer of soft dry adhesive and one layer of shape memory polymer.

Another exemplary embodiment includes a product including an adhesive and an adhesive backing layer, the adhesive backing layer comprising a shape memory polymer foam including a first surface adjacent the dry adhesive layer capable of conforming to the surface topography of a substrate to which the adhesive layer is applied.

Another exemplary embodiment of the invention includes a method comprising providing an adhesive layer and an adhesive backing layer over the adhesive layer, the adhesive backing layer comprising a shape memory polymer foam having a permanent shape at a first temperature within a first temperature range including a surface or face which is sufficiently pliable at a second temperature within a second temperature range so as to conform under pressure to uneven surface topography of a substrate to which the adhesive layer is applied. Upon cooling under pressure to the first temperature within the first temperature range, the contact between the substrate and the adhesive layer with a shape memory polymer foam as the backing layer is improved compared to the same product with a non-foamy shape memory polymer as the backing layer.

Another exemplary embodiment of the invention includes causing the shape memory polymer to have a second shape within a second temperature range so that the shape memory polymer foam changes to a second shape conducive to removing the adhesive backing layer and adhesive from the substrate.

Another embodiment of the invention includes a composition of a multilayer thermo-reversible dry adhesive comprising at least one layer of soft dry adhesive and one layer of shape memory polymer.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE FIGURE

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
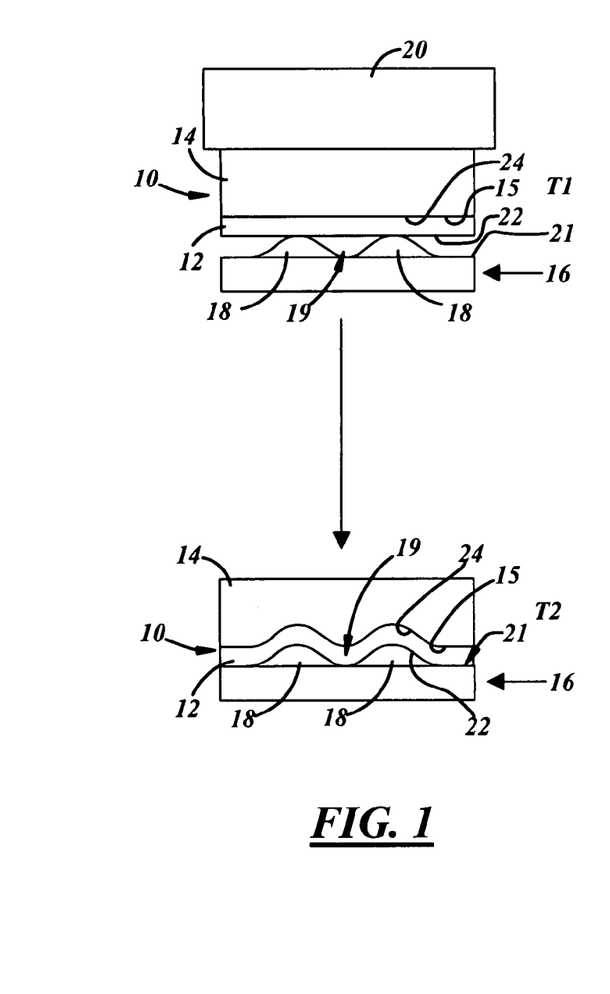
FIG. 1 illustrates a product and a method of using the same according to one embodiment of the invention.

Referring now to FIG. 1, one embodiment of the invention includes a product 10 including an adhesive layer 12 and an adhesive backing layer 14 connected or attached thereto. The adhesive backing layer 14 includes a shape memory polymer foam including a first face 15 adjacent the adhesive layer 12. The shape memory polymer foam may be an open cell or closed cell foam. The first face 15 of the shape memory polymer foam is capable of deforming at a temperature to conform to an uneven or irregular surface topography of a substrate 16. That is, under compressive load the shape memory polymer foam can undergo locally bending deformation resulting in a very large compressive strain at a microscopic scale sufficient to allow the first face 15 of the shape memory polymer foam to adapt to an uneven or irregular surface topography of a substrate 16. The adhesive layer 12 may include a first face 22 for attachment to the substrate 16 and a second face 24 for attachment to or that is connected to the adhesive backing layer 14. In one embodiment the adhesive layer 12 is a separate material and separate layer that is adhered to the adhesive backing layer 14. In an alternative embodiment the adhesive layer 12 may be provided by grafting an adhesive polymer to the shape memory polymer of the adhesive backing layer 14. The grafted adhesive layer may be only one molecule thick or may be 2-10 molecules thick. In one embodiment the adhesive layer 12 may be a dry adhesive. In one embodiment the first face 22 of the adhesive layer 12 may be a continuous, substantially planar surface. In another embodiment the first face 22 of the adhesive layer 12 may include a plurality of extending features (mimicking a gecko) that each may make local contact and attachment and which require more force to remove when pulled from the substrate at a perpendicular angle than if peeled off using a force at an obtuse angle.

The substrate 16 may include a surface 21 that may have an uneven or irregular topography including, for example, but not limited to a plurality of raised features 18 or recesses 19. The adhesive backing layer 14 is or includes a shape memory polymer foam including a first face 15 having a first shape at a first temperature T1 within a first temperature range. For example, the first shape of the shape memory polymer may be such that the first face 15 may be substantially flat or in another embodiment may be convex. The shape memory polymer foam including the first face 15 may be deformable to a second shape at a second temperature T2 within a second temperature range.

Another embodiment of the invention includes a method wherein the product 10 including the adhesive layer 12 and the adhesive backing layer 14 attached thereto may be placed over a substrate 16 having a first surface 21 having an uneven topography wherein the shape memory polymer foam of the adhesive backing layer 14 has a first temperature T1 within a first temperature range so that the first face 15 of the adhesive backing layer 14 has the first shape. The temperature of the shape memory polymer of the adhesive backing layer 14 may be changed to a second temperature T2 that is within a second temperature range above the glass transition temperature of the shape memory polymer foam so that the shape memory polymer foam including the first face 15 can be deformed. At the second temperature T2, pressure may be applied to the adhesive backing layer 14 and the adhesive 12. In one embodiment the pressure may be applied by a separate second substrate 20. At the second temperature T2 and under pressure, the first face 15 of the shape memory polymer of the adhesive backing layer 14 is altered in shape, therein causing the first face 22 of the adhesive layer 12 to be altered in shape as well. This results in a more even distribution of the load being applied by the second substrate 20 and so that the first face 22 of the adhesive layer 12 conforms to the topography of the first face 21 of the substrate 16. The shape memory polymer foam may be cooled under load to below the glass transition temperature of the shape memory polymer foam. The load may be removed so that the product 10 is attached to the substrate 16. In one embodiment the adhered adhesive layer 12 may have a pull-off strength greater than 10 N/cm$^2$ on the stainless steel alloy 304 (SS304) substrate.

In one embodiment the second substrate may be a part of the adhesive backing layer 14. For example, the second substrate may be an automotive body trim piece that is attached to the shape memory polymer foam so that the trim piece may be reversibly attached to an automotive body. In other select embodiments the second substrate may be an article that would be desirable to reversibly attach to a substrate. For example, second substrate which may be attached to the shape memory polymer and adhesive layer combination include, but are not limited to, at least one of a sign, picture, automotive side molding, or surface decorative film.

To remove the product 10 from the substrate 16, the temperature of the shape memory polymer foam of the adhesive backing layer 14 may be changed back to a temperature such as T2 within the second temperature range above the glass transition temperature of the shape memory polymer foam causing the shape memory polymer including the first face 15 to return to a first shape wherein the first face 15 is substantially flat or convex (along with the adhesive layer 12). Depending on the shape of the first face 15 of the shape memory polymer foam, the product 10 can be easily removed from the substrate 16 using no pull-off force, a relative low, reduced pull-off force, or a peeling force.

The shape memory polymer foam may be made from any of a variety of materials suitable for shape memory materials and to which a blowing agent may be added including, but not limited to, epoxy, polyurethane, or crosslinked vinyl polymers. Suitable blowing agents may include, but are not limited to, water or volatile solvent containing microcapsules.

Select illustrative examples of shape memory polymer and adhesive combinations are described hereafter.

One embodiment includes a multilayer adhesive system capable of reversible joining of rigid substrates having a pull-off adhesion force for joining substantially higher than a peeling-off force for dejoining or unjoining or decoupling.

Numerous shape memory polymers may be utilized in various embodiments of the invention. For example, starting with a typical aromatic diepoxy/diamine system with a $T_g$ of about 90° C., the aromatic epoxy component is replaced systematically with an aliphatic diepoxy to yield a series of epoxy shape memory polymers with $T_g$'s ranging from 25° C. to 90° C. As such, a shape memory polymer may be tailored for use with an adhesive as desired for a particular application operated within certain temperature ranges. As such, the adhesive layer may have a $T_g$ ranging from −90° C. to 200° C., and the shape memory polymer may have a $T_g$ ranging from 25° C. to 200° C.

Some embodiments refer to a multilayer epoxy dry adhesive. It should be understood that more than two layers may be utilized. For example, there may be two or more layers of the shape memory polymer foam layer, which may be in a side by side relationship or an overlying relationship. Likewise, there may be two or more dry adhesive layers in a side by side relationship or an overlying relationship. As such, a device with custom or tailored properties may be manufactured.

In various embodiments, the dry adhesive layers may be an epoxy elastomeric dry adhesive. In various embodiments, the shape memory polymer may be an epoxy. In various embodiments of the invention, any combination of a shape memory polymer and an adhesive may be utilized. The following examples of shape memory polymers and adhesives are for illustrative purposes only.

In various embodiments, the components of the dry adhesive or the components of the shape memory polymer may include a rigid epoxy and a flexible epoxy. The range of possible crosslinking chemistries which may be used to achieve a dry adhesive or shape memory polymer may include alpha, omega-diaminoalkanes, monoamines, organic multi-carboxylic acids, anhydrides, or catalytic (as in imidazole type) crosslinking reagents. There are many different ways to achieve the appropriate relationships between the molecular properties. For example, the adhesives (particularly dry adhesives) or shape memory polymers may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various embodiments, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. In one embodiment, the components of the dry adhesive may be present in an amount sufficient to provide, upon curing of the composition, a dry adhesive having a glass transition temperature of −90° C. to 200° C. and having a pull-off strength of 1-4,000 N/cm$^2$ from a substrate. In one embodiment, the components of the shape memory polymer composition may be present in an amount sufficient to provide, upon curing of the composition, an epoxy shape memory polymer having a change in storage modulus of 2 to 3 orders of magnitude before and after its glass transition.

One embodiment of the invention includes a method of making a multilayer thermo-reversible dry adhesive comprising heating 3.6 g of EPON 826 (a Bisphenol A based epoxy resin) to about 75° C. and mixing the same with 2.16 g of neopentyl glycol diglycidyl ether (NGDE) and 2.3 g of a diamine such as Jeffamine D-230. Jeffamine D-230 is a polyetheramine that is difunctional, primary amine with an average molecular weight of about 230. The primary amine groups are located on secondary carbons at the end of the aliphatic polyether chain. Jeffamine is available from Huntsman.

The mixture may be poured into a mold with a blowing agent and may then be cured in any shape desired. The curing condition is 100° C. for 1.5 hours. Then a mixture of 2.16 g of NGDE and 1.15 g of an amine such as Jeffamine D-230 is cured on the outer surface of the shape memory polymer layer for 1.5 hours at 100° C. In a third step, the oven temperature may be raised to 130° C. for post-curing for about one hour.

At the end of the post-curing, the cured two-layer epoxy was demolded and cut into small pieces of about 1 cm×1 cm and the exact dimensions were measured. A double layer epoxy was obtained including a first shape memory polymer layer with a glass transition temperature of about 40° C., and a second soft dry adhesive layer. The thickness of the first layer was about 2 mm. The thickness of the second layer was about 1 mm. The double layer epoxy obtained may be known as a double layer adhesive (DLA). In one embodiment, the DLA samples were heated to 90° C. for 5 minutes and allowed to cool down to room temperature prior to their use.

The yielded double layer epoxy structure had a slightly curved structure due to the thermal mismatch between the first and second layers. The curved structure is advantageous in providing a reversibility of the adhesion. This curved structure can also be created by specifically designed molds.

Numerous shaped memory polymers may be utilized in various embodiments of the invention. For example, staring with a typical aromatic diepoxy/diamine system with a $T_g$ of about 90° C., the aromatic epoxy component is replaced systematically with an aliphatic diepoxy to yield a series of epoxy shape memory polymers with $T_g$'s ranging from 25° C. to 90° C. As such, a shape memory polymer may be tailored for use with a dry adhesive as desired for a particular application operated within certain temperature ranges.

The following is another embodiment of the invention providing a method of making a shape memory polymer. EPON 826 was weighed into a glass bottle and placed into an oven preset at 70° C. to melt. The melting took about 1 hour. Immediately after the bottle containing the EPON 826 was taken out of the oven, weighed Jeffamine D-230 and NGDE were added to the bottle. The bottle was then shaken vigorously by hand for about ten seconds to mix the components. The detailed formulations of the five epoxy SMP samples prepared according to the method are summarized in Table 1.

TABLE 1

Formulations of epoxy samples 1-5

| Sample # | EPON 826 (mole) | NGDE (mole) | effamine D-230 (mole) |
|---|---|---|---|
| 1 | 0 | 0.02 | 0.01 |
| 2 | 0.005 | 0.015 | 0.01 |
| 3 | 0.01 | 0.01 | 0.01 |
| 4 | 0.015 | 0.005 | 0.01 |
| 5 | 0.02 | 0 | 0.01 |

Next, the mixture was poured into a mold. The epoxy samples were thermally cured at 100° C. for 1.5 hours and postcured at 130° C. for 1 hour. Upon the completion of the cure, the epoxy samples were demolded. The geometry of the shape memory polymer layer obtained is determined by the mold used. In the case of foam the blowing agent may be added as the mixture is poured.

In another embodiment, the system consists of EPON 826, Jeffamine D-230 as the crosslinker, and decylamine as the monoamine. As shown in Table 2, from sample 6 to 11, the fraction of the crosslinker is systematically reduced, while the total amounts of epoxy functionality and active hydrogen functionality on the amines are maintained equal. Among these samples, sample 11 was used as a reference sample because it contains no crosslinker and is not expected to possess shape memory properties. The shape memory epoxy polymers according to the formulations in Table 2 have $T_g$'s from 25° C. to 90° C.

TABLE 2

Formulations of epoxy samples 6-11

| Sample # | EPON 826 (mole) | effamine D-230 (mole) | decylamine (mole) |
|---|---|---|---|
| 6 | 0.02 | 0.01 | 0 |
| 7 | 0.02 | 0.0075 | 0.005 |
| 8 | 0.02 | 0.005 | 0.01 |
| 9 | 0.02 | 0.0025 | 0.015 |
| 10 | 0.02 | 0.0005 | 0.019 |
| 11 | 0.02 | 0 | 0.02 |

An example of a method of making a dry adhesive includes mixing 2.16 g of NGDE and 1.15 g of Jeffamine D-230 and curing the mixture on top of the cured epoxy shape memory foam mentioned above.

Figure 2:
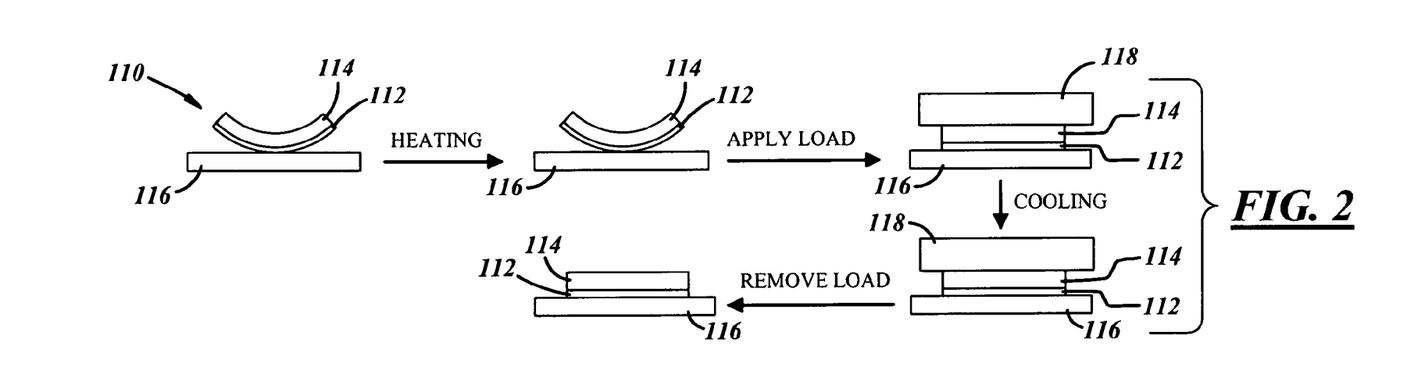
FIG. 2 illustrates a double layer adhesive after heating and applying a load, and after cooling and removing the load.

In one embodiment, a method of forming an adhesive bond is provided. Referring now to FIG. 2, a curved DLA 110 (comprising a dry adhesive layer 112 and an SMP layer 114) was placed on a substrate 116, for example a stainless steel (SS304) substrate, and heated to a temperature higher than the glass transition temperature ($T_g$) of the shape memory polymer layer with the dry adhesive layer 12 facing down on the substrate. In one embodiment, the DLA 110 was heated inside a 90° C. oven. After about 10 minutes of heating, the DLA 110 and the substrate 116 were removed from the oven and a load 118 of about 4 N was imposed immediately on the upper SMP layer 14. With the load on, the DLA was allowed to cool to a temperature below the $T_g$ of the shape memory polymer layer. In one embodiment, the DLA was allowed to cool under ambient conditions for about 10 minutes. Thereafter, the load was removed and the bonded sample (DLA on SS304) was subjected to an adhesion test.

Figures 3, 4:
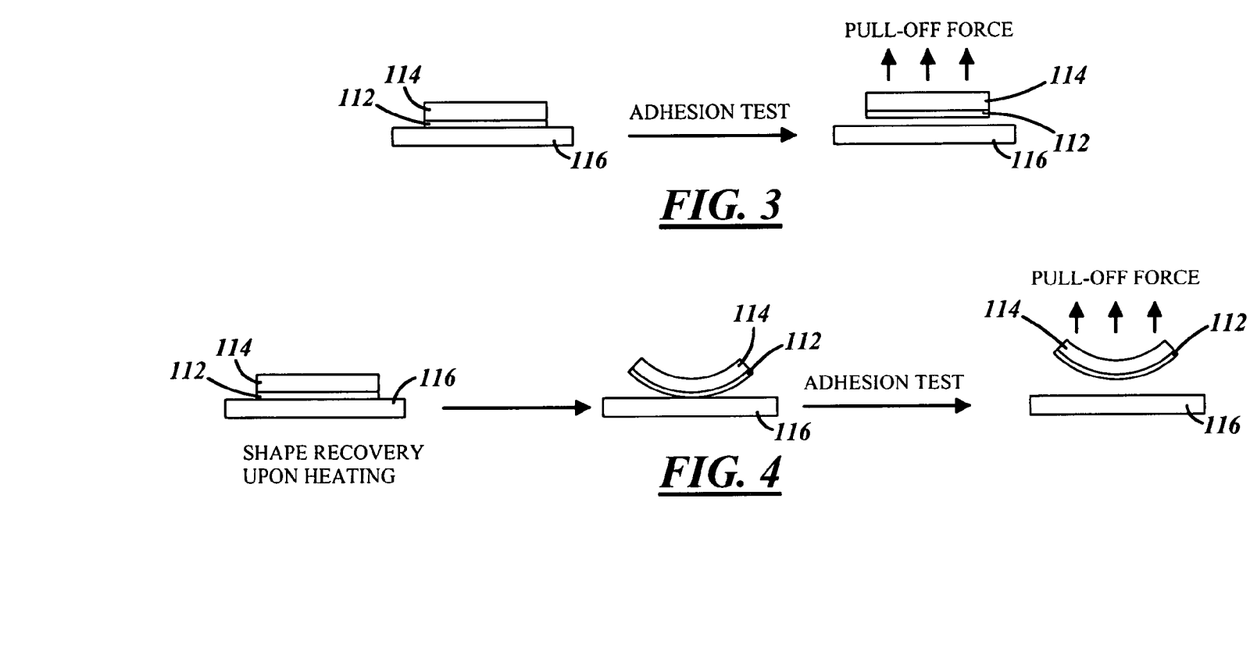
FIG. 3 illustrates an adhesion test to measure the pull-off force of a double layer adhesive.
FIG. 4 illustrates an adhesion test to measure the pull-off force of a double layer adhesive.

A method of measuring the pull-off force is shown in FIG. 3. The bonded DLA sample was separated from the SS304 substrate with a pull-off force normal to the substrate. The maximum pull-off force at the point of separation was measured by a load cell. In one embodiment, this maximum pull-off strength was about 60 N/cm². Unless otherwise noted, the pull-off strength was calculated by the maximum separation force divided by the DLA surface area.

In one embodiment, one bonded sample was heated in a 90° C. oven for about 10 minutes with no load. Immediately after the sample was taken out of the oven, the bonding separation was conducted in a peel-off mode and the peel-off force measured was less than 1 N/cm.

Another embodiment includes a method of measuring the pull-off force to test the thermo-reversibility of the adhesion, as shown in FIG. 4. The bonded sample was heated with no load to a temperature higher than the $T_g$ of the shape memory polymer layer. In one embodiment, the bonded sample was heated in a 90° C. oven for about 10 minutes with no load. After the heating, the restoration of the curve was observed as a result of the shape memory property of the SMP layer. The sample, after cooling down to ambient temperature under no load, was submitted to an adhesion test and the pull-off strength measured was about 6 N/cm². Overall, the dry adhesive layer and the shape memory polymer layer determine the adhesive strength and thermo-reversibility, respectively.

Thus according to one embodiment of the invention a curved structure was provided consisting of a dry adhesive layer and a layer of shape memory polymer. By heating to a temperature higher than the glass transition temperature ($T_g$) of the shape memory polymer, and imposing a load while cooling to a temperature below the $T_g$, the double layer structure formed a strong adhesive bond with a stainless steel substrate with a pull-off force of about 60 N/cm². The strong bond may be automatically released by heating the structure to a temperature above the $T_g$ of the shape memory polymer to restore the curvature.

In one embodiment, the substrate 116 may be flat and the DLA 110 may be curved. In another embodiment, the first substrate 116 may be curved and the DLA 110 may be flat.

Figure 5:
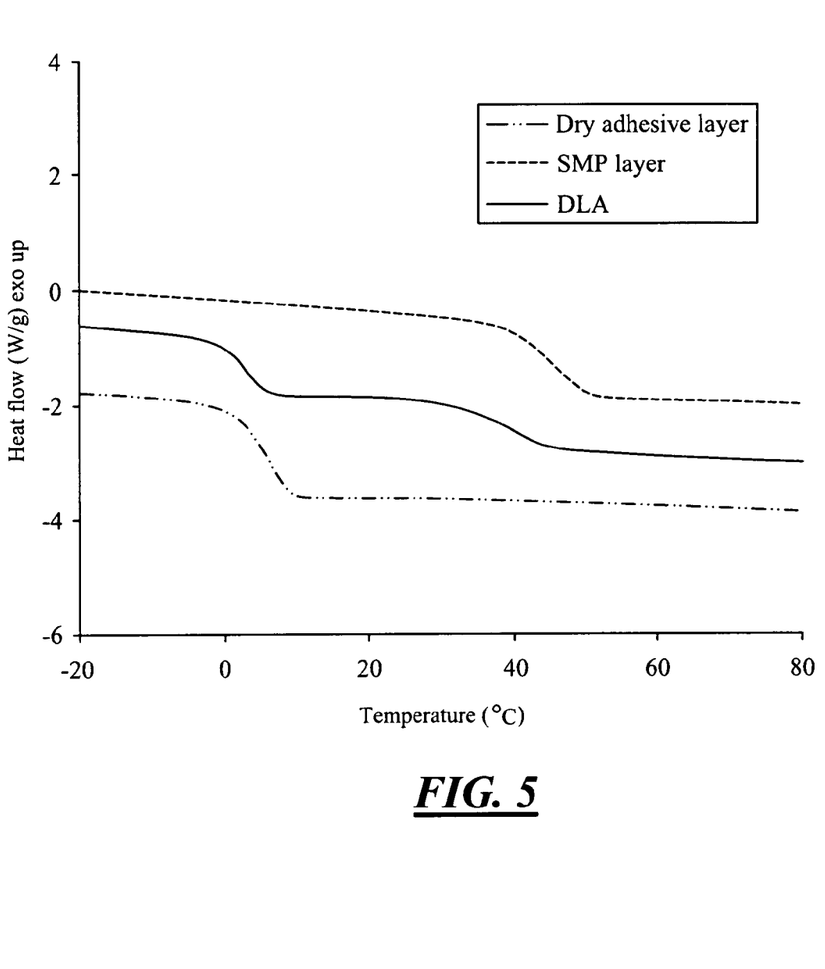
FIG. 5 illustrates differential scanning calorimetry curves for the dry adhesive layer, the shape memory polymer layer, and the double layer adhesive.

In one embodiment, a DLA comprising the SMP layer and the dry adhesive layer was prepared according to the method described above. Differential scanning calorimetry (DSC) measurements were made under nitrogen using a DSC Q1000 (TA instruments) at a heating rate of 10° C. min⁻¹. FIG. 5 shows the DSC curves for the SMP layer, the dry adhesive layer, and the DLA. Referring to FIG. 5, the DSC curve for the DLA shows two distinctive glass transitions at 39.9° C. and 3.0° C. These two glass transition temperatures are in line with the $T_g$'s measured for the SMP layer and the dry adhesive layer cured separately, as shown in FIG. 5. No exothermal peaks were observed in any of the three DSC curves in FIG. 5, indicating completion of the cure in all three cases.

Qualitatively, the epoxy layer with a $T_g$ lower than room temperature may be sticky towards many substrate surfaces such as glass and is thus a soft dry adhesive. The epoxy with a $T_g$ higher than room temperature is rigid and non-sticky at room temperature. The epoxy layer with a $T_g$ of 39.9° C. is expected to exhibit shape memory properties above room temperature.

Figure 6A:
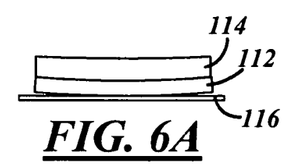
FIG. 6A illustrates a double layer adhesive according to one embodiment of the invention.
Figure 6B:
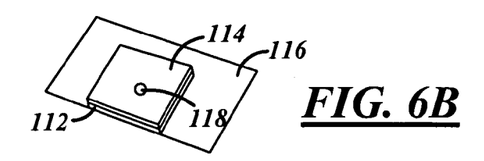
FIG. 6B illustrates a double layer adhesive according to one embodiment of the invention.

In one embodiment, the adhesion reversal process was observed for a DLA sample with dimensions of 1.03 cm by 1.02 cm by 0.21 cm, prepared according to the method described above. FIGS. 5A and 5B show the side and top view, respectively, of the as-prepared DLA sample positioned on an SS304 substrate 16 (macroscopically flat with an $R_a$ of 73 μm). FIG. 6A shows the side view of the DLA 110, including the dry adhesive layer 112 and the SMP layer 114. In one embodiment, the dry adhesive layer has a thickness of 0.07 cm and the SMP layer has a thickness of 0.14 cm. A closer examination of FIGS. 6A and 6B reveals that the DLA has a slight curvature, which may originate from the thermal mismatch between the two epoxy layers. As shown in FIGS. 6A and 6B, in one embodiment the DLA had poor contact with the substrate surface, which may be caused by the curvature of the DLA and the rigid nature of the SMP layer at room temperature. FIG. 6B shows a contact spot 118 of the DLA with the SS304 substrate surface. Without heating, a preload of 4 N/cm² was imposed on the DLA positioned on top of the SS304 surface with the dry adhesive layer facing down. After the removal of the load, pull-off strength of 9.0 N/cm² was measured.

Figure 6C:
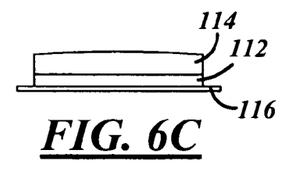
FIG. 6C illustrates a double layer adhesive according to one embodiment of the invention.
Figure 6D:
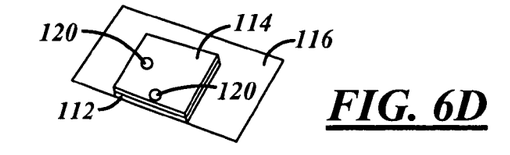
FIG. 6D illustrates a double layer adhesive according to one embodiment of the invention.

To improve the surface contact between the DLA and the stainless steel substrate, preheating of DLA at 90° C. (about 50° C. above the $T_g$ of the SMP layer) was employed during the formation of the adhesive bonding, as described above. In one embodiment, the DLA deformed immediately when the preload (4 N/cm²) was imposed. After the subsequent cooling, the preload was removed and the deformed shape of DLA was maintained (FIG. 6C). The DLA deformation ensured that it complied with the stainless steel substrate. As a result, very good contact between the dry adhesive and the substrate was achieved at a macroscopic scale (FIGS. 6C and 6D). FIGS. 6C and 6D show the side and top view, respectively, of the bonded sample with maximum surface contact. Two small non-contact spots 120 were observed in FIG. 6D, which may be attributed to the unevenness of the load distribution. The pull-off strength measured for the bonded sample was 61.5 N/cm$^2$.

Figure 6E:
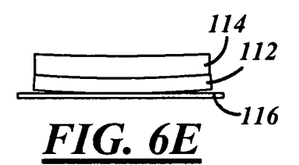
FIG. 6E illustrates a double layer adhesive according to one embodiment of the invention.
Figure 6F:
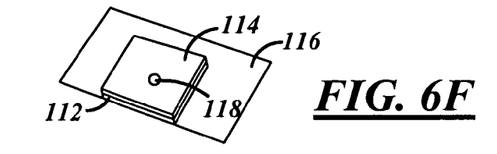
FIG. 6F illustrates a double layer adhesive according to one embodiment of the invention.

The adhesive bonding procedure was repeated and the bonded sample, instead of being separated by a pull-off force, was heated to 90° C. with no load except its own weight (0.26 g or 0.0026 N). FIGS. 6E and 6F show the side and top view, respectively, of the thermal recovered sample. After the heating, it was observed that the DLA returned to its original curved structure (FIG. 6E) and the contact area became small (FIG. 6F). After the heating and recovery of the curvature, the sample was taken out of the oven and the remaining small adhesive contact area was immediately separated by peeling. The recorded peel-off force was less than 0.1 N, which is a much smaller force than the pull-off force of 61.5 N. In one embodiment, the shape recovered sample was allowed to cool down to 25° C. and the DLA became rigid. Although peeling was no longer possible, the separation could still be done in a pull-off mode. This led to pull-off strength of 6.3 N/cm$^2$, which was about 10 times lower than the pull-off strength of 61.5 N/cm$^2$ measured without the thermal treatment at 90° C. This shows that the adhesion was reversed via heating.

For a reversible dry adhesive, a minimum preload is required to achieve maximum contact between the dry adhesive and a substrate, and therefore to achieve a maximum pull-off force. To establish such a criterion for minimum preload, a DLA sample was bonded to SS304 under a range of preloads and the corresponding maximum separating forces were recorded.

Figure 7:
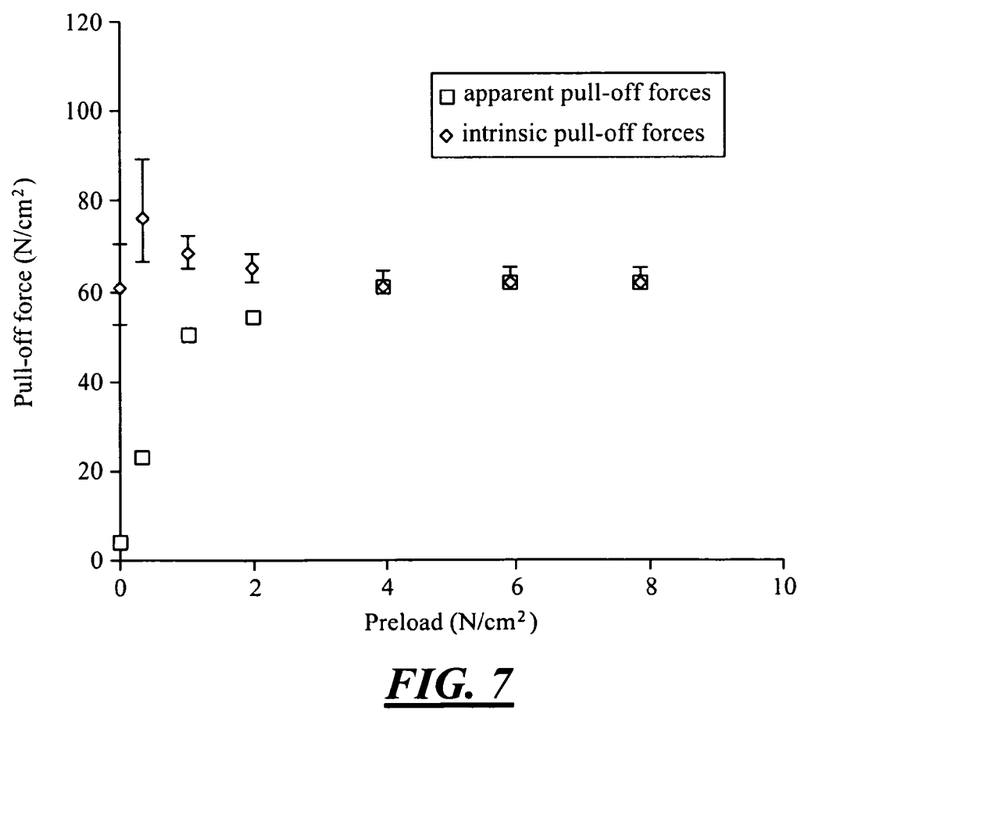
FIG. 7 illustrates the apparent and intrinsic pull-off forces of a double layer adhesive.

As noted above, the pull-off strength was obtained by dividing the separation force by the overall DLA surface area. This represents the apparent pull-off strength. FIG. 7 shows the impact of the preloads on the pull-off forces where the substrate is SS304, Ra=73 μm. As shown in FIG. 7, the apparent pull-off strength increased with the preloads (N/cm$^2$) until it reached a plateau at a preload of about 4 N/cm$^2$. Also shown in FIG. 6 is the intrinsic pull-off strength, which is the pull-off strength calculated after the actual macroscopic contact areas were estimated. The intrinsic pull-off strength based on such a definition is plotted in FIG. 7, with the error bars reflecting the difficulty in accurately estimating the actual contact areas particularly when preloads were small. Unlike the trend observed for the apparent pull-off strength, the intrinsic pull-off strength remains constant within the preload range.

Figure 8:
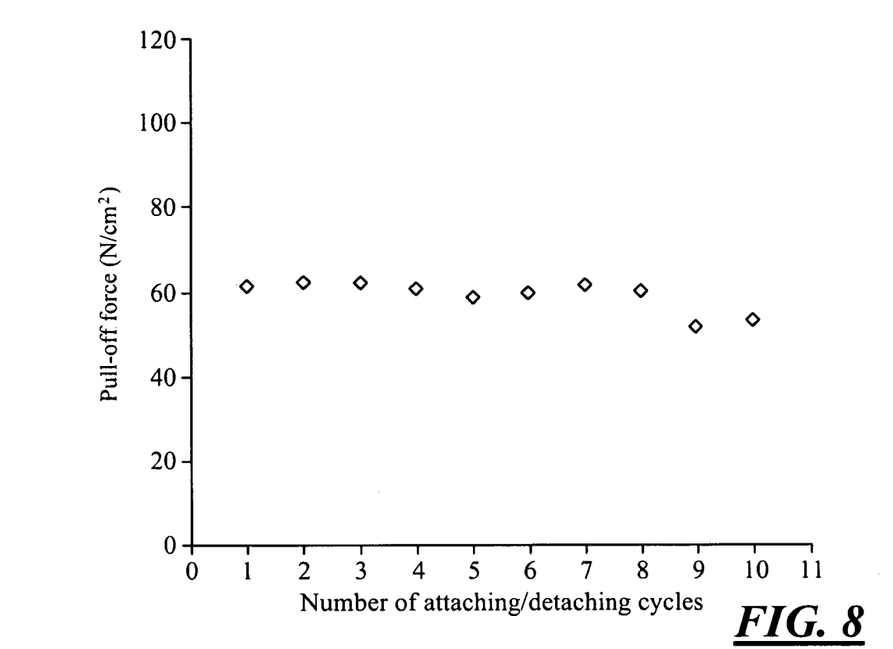
FIG. 8 illustrates the pull-off force of a double layer adhesive versus number of attaching/detaching cycles.

The durability of the DLA may be investigated by repeated attaching-detaching cycles with preloads sufficient to make maximum surface contacts. The pull-off strength measured after each attaching/detaching cycle from the stainless steel substrate (SS304, R$_a$=73 μm) is shown in FIG. 8. Data in this figure show no reduction in the pull-off strength on the first eight cycles. On the ninth and tenth cycles, a slight drop in pull-off strength (roughly 10%) was measured, accompanied by the appearance of some surface defect on the dry adhesive surface. The detachment of the adhesive bonds during the durability tests was conducted without adhesion being reversed thermally. In another embodiment, the adhesive bond may be detached via the thermal adhesion reversal mechanism, which is far less harsh than the detachment method used in the above durability tests. Nevertheless, even under the harsh detachment condition used in the cycling tests, the DLA shows very good durability, in sharp contrast to the typical poor durability of synthetic gecko adhesives.

Figure 9:
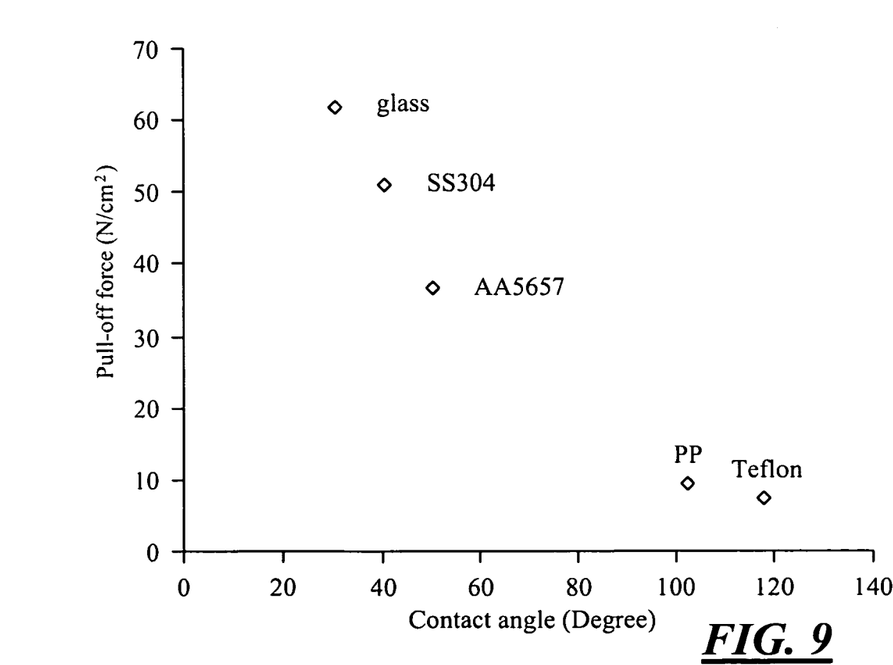
FIG. 9 illustrates the pull-off force of a double layer adhesive attached to various substrates versus their water contact angles.

One of the major attributes of a gecko footpad is its ability to bond to a wide variety of substrates. In one embodiment, the adhesion of the DLA was examined towards a range of substrates, including an inorganic substrate (glass), metals (SS304 and aluminum alloy 5657), and hydrophobic polymers (polypropylene and Teflon). The pull-off strength measured is: glass (61.9 N/cm$^2$)>SS304 (51.0 N/cm$^2$)>aluminum alloy 5657 (36.6 N/cm$^2$)>>polypropylene (9.3 N/cm$^2$)>Teflon (7.3 N/cm$^2$). Referring to FIG. 9, the pull-off strength towards these surfaces is plotted against their water contact angles, showing that the pull-off strength decreases with the substrate surface hydrophobicity.

The essence of the gecko adhesion phenomenon is about making and controlling contact. For synthetic gecko adhesives made of rigid materials, maximizing contact may be a difficult task, as evidenced by the unusually high preloads required to achieve adhesion. One embodiment provides the combination of a soft dry adhesive with an SMP to create the DLA. Due to the SMP layer, the DLA can deform and adapt to the profile of a counter surface upon heating. The SMP layer further allows the deformed shape to be maintained after cooling (shown in FIGS. 6C and 6D). As a result, a macroscopically near perfect contact with the counter surface was achieved, which led to the pull-off strength of about 60 N/cm$^2$ measured against the SS304 substrate. The SMP layer is only responsible for maximizing the contact, while the intrinsic adhesion is provided by the dry adhesive layer. This pull-off strength of 60 N/cm$^2$ is 6-20 times higher than those reported for natural and synthetic gecko adhesives. Additionally, the maximum pull-off strength of 60 N/cm$^2$ was achieved with a minimum preload of 4 N/cm$^2$. This minimum preload requirement is about 1-2 orders of magnitude lower than the reported examples of synthetic gecko adhesives (50 N/cm$^2$ and ~300 N/cm$^2$, respectively), and is more in line with the low preload requirement for natural geckos.

Such a desirable attribute in principle arises from the low moduli of the two epoxy layers at a temperature above their T$_g$'s. The constant intrinsic pull-off strength in the whole preload range (shown in FIG. 7), on the other hand, implies that the function of the preloads is to deform the SMP and that no additional preload is required for the dry adhesive layer to adapt to the profile of the substrate surface. Again, such a behavior is attributed to the elastic nature (low modulus at room temperature) of the dry adhesive layer.

The adhesion reversal for the DLA is accomplished via heating, unlike natural and synthetic gecko adhesives. In one embodiment, the shape recovery of the DLA (thus adhesion reversal) upon heating can occur despite the large pull-off strength measured between the DLA and SS304 substrate. The original curvature plays a critical role here. During the shape recovery process to return to the original curvature, the interfacial separation started from the edge and gradually propagated to the center. In a way, this was a peeling process or more precisely a self-peeing process, as no external peeling force was involved. In this case, neither the large pull-off strength nor the magnitude of the recovery force of the SMP was relevant. Indeed, since the SMP was soft at a temperature above its T$_g$, the softness of the DLA in principle would have allowed the separation to occur in a peel-off mode.

The thermal reversibility of the adhesion for the DLA has important implications. A natural gecko controls its adhesion and the reversal process through its mechanical toe actions. A synthetic gecko adhesive at its best mimics only a gecko footpad, not the mechanical toe actions. For a synthetic gecko adhesive, when good adhesion is needed, accidental peeling should be avoided in which case a rigid backing layer may be desirable in principle. The rigid backing layer, however, would not allow peeling actions needed for the adhesion reversal/detachment. Indeed, the inability to reverse the adhesion for a synthetic dry adhesive with a rigid backing layer was reported. Unless a mechanical device is introduced to mimic mechanical gecko toe actions, the above paradox is difficult to avoid.

On the one hand, the SMP of one embodiment is rigid below its glass transition and the rigidity inhibits unwanted peeling to ensure good adhesion. On the other hand, the SMP becomes flexible at temperatures above its $T_g$, allowing peeling for adhesion reversal. Even when the SMP is cooled down to a temperature below its $T_g$ after its shape recovery, the curvature results in a 10 times drop in the pull-off strength. Thus, the controllability of the DLA adhesion is twofold: 1) the thermal transition of the SMP from being rigid to flexible turns the ability to peel on and off, in this case, the curvature is not required; and 2) the shape recovery ability and the original curved structure create a self-peeling mechanism to control the contact area, thus the adhesion. The DLA curvature originating naturally from the thermal mismatch allows the second controlling mechanism to occur. Curvatures created by purposeful mold design may have the same effect. For the DLA overall, the dry adhesive layer functions more like a gecko footpad, while the SMP layer resembles a gecko toe in terms of the mechanical function to control adhesion. This general approach of using an SMP to control the adhesion and adhesion reversal may be applied to any other dry adhesives. The adhesion reversal triggering temperature may be adjustable based on the $T_g$ of the SMP selected.

In one embodiment, the adhesion durability of the DLA may be far superior to typical synthetic adhesives because the DLA does not have a nano-hair structure. The poor durability of reported synthetic gecko adhesives is due to the breakdown and/or the lateral collapse (bunching) of the nano-hairs.

Some embodiments refer to a multilayer epoxy dry adhesive. It should be understood that more than two layers may be utilized. For example, there may be two or more layers of the shape memory polymer layer, which may be in a side by side relationship or an overlying relationship. Likewise, there may be two or more dry adhesive layers in a side by side relationship or an overlying relationship. As such, a device with custom or tailored properties may be manufactured.

In various embodiments of the invention, any combination of a shape memory polymer and a dry adhesive may be utilized. The following examples of shape memory polymers and dry adhesives are for illustrative purposes only.

In various embodiments, the components of a dry adhesive or the components of a shape memory polymer may include a rigid epoxy and a flexible epoxy. The range of possible crosslinking chemistries which may be used to achieve a dry adhesive or shape memory polymer may include alpha, omega-diaminoalkanes, anhydride, or catalytic (as in imidazole type) crosslinking reactions. There are many different ways to achieve the appropriate relationships between the molecular properties. For example, the dry adhesives or shape memory polymers may include a rigid epoxy, an epoxy extender, and a crosslinking agent; or a rigid epoxy, a flexible crosslinking agent, and a flexible epoxy; or a rigid epoxy, a rigid crosslinking agent, and a flexible epoxy; or a rigid epoxy, a flexible epoxy, and a catalytic curing agent; or a rigid epoxy, a crosslinking agent, and a diluent; or a flexible epoxy, a crosslinking agent, and a diluent; or a rigid epoxy and a flexible crosslinking agent; or a flexible epoxy and a catalytic curing agent; or a flexible epoxy and a crosslinking agent; and wherein the rigid epoxy is an aromatic epoxy having at least two epoxide groups, the flexible epoxy is an aliphatic epoxy having at least two epoxide groups, the epoxy extender has one epoxide group, and the crosslinking agent is one of a multi-amine, an organic multi-carboxylic acid, or an anhydride, and the diluent is a monoamine or a mono-carboxylic acid. In various embodiments, the catalytic curing agent (or catalytic cure) promotes epoxy-to-epoxy or epoxy-to-hydroxyl reactions. The catalytic curing agent may include, but is not limited to, tertiary amines, amine salts, boron trifluoride complexes, or amine borates. The components of the dry adhesive may be present in an amount sufficient to provide, upon curing of the composition, a dry adhesive having a glass transition temperature of −90° C. to 200° C. and having a pull-off strength of 1-200 N/cm$^2$ from a substrate. In one embodiment, the components of the shape memory polymer composition may be present in an amount sufficient to provide, upon curing of the composition, an epoxy shape memory polymer having a change in storage modulus of 2 to 3 orders of magnitude before and after its glass transition.

The above description of embodiments of the invention is merely exemplary in nature and, thus, variations thereof are not to be regarded as a departure from the spirit and scope of the invention.

What is claimed is:

1. A product comprising:
a thermo-reversible dry adhesive comprising:
a dry adhesive layer and;
an adhesive backing layer comprising a shape memory polymer having a glass transition temperature connected or attached to the dry adhesive layer, said backing layer including a first surface adjacent the dry adhesive layer capable of conforming to the surface topography of a first substrate to which the adhesive layer is applied and thereby forming a first shape conforming to said surface topography at a first temperature that is below the glass transition temperature;
wherein the thermo-reversible dry adhesive is constructed and arranged to change to a second shape at a second temperature that is above the glass transition temperature without the application of a load, the second shape being conducive to removing the thermo-reversible dry adhesive from the first substrate at temperatures that are above and below the glass transition temperature; and
wherein the dry adhesive comprises a soft dry adhesive having a glass transition temperature between −90° C. and 200° C. and said shape memory polymer has a glass transition temperature between 25° C. and 90° C.

2. The product of claim 1, wherein the shape memory polymer comprises a shape memory polymer foam comprising at least one of an epoxy, a polyurethane or a crosslinked vinyl polymer.

3. The product as set forth in claim 1 wherein the shape memory polymer comprises a product of a reaction mixture comprising:
at least one of a rigid epoxy or a flexible epoxy; and
at least one of a crosslinking agent or a catalytic curing agent;
wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

4. The product as set forth in claim 1, wherein the soft dry adhesive comprises a product of a reaction mixture comprising:
at least one of a rigid epoxy or a flexible epoxy; and at least one of a crosslinking agent or a catalytic curing agent;

wherein the rigid epoxy is an aromatic epoxy having at least two epoxide groups, the flexible epoxy is an aliphatic epoxy having at least two epoxide groups, and the crosslinking agent is one of a multi-amine, an organic multi-carboxylic acid, or an anhydride.

5. The product as set forth in claim 1 further comprising said first substrate and a second substrate attached to a second face of said backing layer.

6. The product as set forth in claim 1 wherein said second shape is a relatively curved structure and the pull-off force of the thermo-reversible dry adhesive with the curved structure is about 0 to 50 N/cm$^2$ from the first substrate.

7. The product as set forth in claim 1 wherein said first shape is a relatively flat structure and the pull-off force of the thermo-reversible dry adhesive with the relatively flat structure is about 10 to about 200 N/cm$^2$ from the first substrate.

8. The product as set forth in claim 5 wherein the at least one of the first or second substrate comprises at least one of an automotive body trim piece, a sign, a picture, an automotive side molding, or a surface decorative film.

9. The product as set forth in claim 8 wherein the at least one of the first or second substrate comprises one of stainless steel, glass, aluminum alloy 5657, polypropylene, or Teflon.

10. The product as set forth in claim 1, wherein the dry adhesive is grafted to the shape memory polymer to form a single layer.

11. A method comprising:
providing a thermo-reversible dry adhesive comprising at least one dry adhesive layer and at least one adhesive backing layer comprising a shape memory polymer layer;
providing a substrate to be adhered to said dry adhesive, wherein said thermo-reversible dry adhesive is constructed and configured to have an original shape different from the corresponding topography of the substrate;
heating the thermo-reversible dry adhesive to a temperature higher than a glass transition temperature of the shape memory polymer layer;
imposing a load on the thermo-reversible dry adhesive while cooling to a temperature below the glass transition temperature of the shape memory polymer layer, so that the dry adhesive layer substantially conforms to the corresponding topography of the underlying substrate to form a strong adhesive bond to the underlying substrate; and
heating the thermo-reversible dry adhesive to a temperature above the glass transition temperature of the shape memory polymer without load to cause the shape memory polymer to revert to its original shape, thereby causing the dry adhesive layer to at least partially peel off from the substrate or to have reduced pull-off force from the substrate at a temperature below the glass transition temperature of the shape memory polymer.

12. The method as set forth in claim 11 wherein the load is about 1 N/cm$^2$ to about 20 N/cm$^2$.

13. The method as set forth in claim 11 wherein the glass transition temperature of the shape memory polymer is about 25 to about 200° C.

14. The method as set forth in claim 13 wherein the glass transition temperature of the dry adhesive is about −90 to about 200° C.

15. A product comprising:
an adhesive layer comprising a reaction product of a first mixture comprising a flexible epoxy comprising an aliphatic epoxy having at least two epoxide groups and a crosslinking agent; and
an adhesive backing layer comprising a shape memory polymer produced from a second mixture comprising a rigid epoxy comprising an aromatic epoxy having at least two epoxide groups, a flexible epoxy comprising an aliphatic epoxy having at least two epoxide groups, and a crosslinking agent,
wherein said adhesive layer is attached to at least a portion of said backing layer and the glass transition temperature of the shape memory polymer is between 25° C. and 200° C.

16. The product as set forth in claim 15 wherein said adhesive backing layer comprises a shape memory polymer foam having an open or closed cell foam structure and said second mixture further comprises a foaming agent optionally included in a microcapsule.

17. The product as set forth in claim 15 wherein the crosslinking agent is at least one of multi-amine, polyetheramine, poly(propylene glycol)bis(2-aminopropyl)ether, decylamine, an organic multi-carboxylic acid, and an anhydride.

18. The product as set forth in claim 17 wherein the rigid epoxy is diglycidyl ether of bisphenol A, said flexible epoxy is neopentyl glycol diglycidyl ether and the crosslinking agent comprises a diamine.

19. The product as set forth in claim 15 wherein said glass transition temperature is between 25° C. and 90° C.

20. The product as set forth in claim 1 wherein said dry adhesive layer includes a plurality of extending features that each may make local contact with and attachment to said first substrate, and requires more force to remove when pulled from the first substrate at a perpendicular angle than if peeled off using a force at an obtuse angle.

* * * * *